US007825639B1

(12) United States Patent
Suzuki et al.

(10) Patent No.: US 7,825,639 B1
(45) Date of Patent: Nov. 2, 2010

(54) MINIMIZING POWER CONSUMPTION OF A REFERENCE VOLTAGE CIRCUIT USING A CAPACITOR

(75) Inventors: Hidehiko Suzuki, Tokyo (JP); Hidenori Kobayashi, Tokyo (JP); Nicky Miles Johnson, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/454,721

(22) Filed: May 21, 2009

Related U.S. Application Data

(62) Division of application No. 10/839,726, filed on May 5, 2004, now Pat. No. 7,567,063.

(51) Int. Cl.
*H01M 10/46* (2006.01)

(52) U.S. Cl. ..................................................... 320/166

(58) Field of Classification Search ................. 320/107, 320/127, 166; 323/312, 313, 315
See application file for complete search history.

(56) References Cited

U.S. PATENT DOCUMENTS

| | | | |
|---|---|---|---|
| 3,633,052 | A | 1/1972 | Hanna |
| 4,447,784 | A | 5/1984 | Dobkin |
| 4,849,661 | A | 7/1989 | Bazes |
| 5,311,084 | A | 5/1994 | Gabara |
| 5,384,740 | A | 1/1995 | Etoh et al. |
| 5,453,679 | A | 9/1995 | Rapp |
| 5,686,823 | A | 11/1997 | Rapp |
| 5,859,526 | A | 1/1999 | Do et al. |
| 6,060,874 | A | 5/2000 | Doorenbos |
| 6,075,354 | A | 6/2000 | Smith et al. |
| 6,198,266 | B1 | 3/2001 | Mercer |
| 6,201,379 | B1 | 3/2001 | MacQuigg et al. |
| 6,380,723 | B1 | 4/2002 | Sauer |
| 6,414,537 | B1 | 7/2002 | Smith |
| 6,534,806 | B1 | 3/2003 | Wert |
| 6,677,808 | B1 | 1/2004 | Sean et al. |
| 7,567,063 | B1 * | 7/2009 | Suzuki et al. ............... 320/166 |
| 2002/0163378 | A1 | 11/2002 | Kadanka |

FOREIGN PATENT DOCUMENTS

| | | |
|---|---|---|
| JP | 2005-50021 | 2/2005 |

OTHER PUBLICATIONS

S. Mehrmanesh, et al., "A 1-Volt, High PSRR, CMOS Bandgap Voltage Reference", 2003 IEEE, p. 381-384.
Andrea Pierazzi, et al., "Band-Gap References for near 1-V operation in standard CMOS technology", IEEE 2001 Custom Integrated Circuits Conference, p. 463-466.

* cited by examiner

*Primary Examiner*—Edward Tso

(57) ABSTRACT

A system and method is disclosed for minimizing power consumption in a reference voltage circuit. A capacitor is coupled to a reference voltage circuit and charged to a voltage that equals the reference voltage of the reference voltage circuit. The capacitor is then decoupled from the reference voltage circuit and power to the reference voltage circuit is turned off. The capacitor then provides the capacitor voltage to other circuits as a reference voltage. After a selected period of time has elapsed since the capacitor was last charged to the reference voltage, the reference voltage circuit is turned on and the capacitor is again coupled to the reference voltage circuit. The reference voltage circuit then recharges the capacitor to the reference voltage level. This process is repeated to periodically charge the capacitor to the reference voltage.

20 Claims, 5 Drawing Sheets

MINIMIZING POWER CONSUMPTION OF A REFERENCE VOLTAGE CIRCUIT USING A CAPACITOR

This application is a divisional of prior U.S. patent application Ser. No. 10/839,726 filed on May 5, 2004 now U.S. Pat. No. 7,567,063.

TECHNICAL FIELD OF THE INVENTION

The present invention is generally directed to manufacturing technology for reference voltage circuits and, in particular, to a system and method for minimizing the power consumption of a reference voltage circuit.

BACKGROUND OF THE INVENTION

In some types of semiconductor devices it is necessary to provide a reference voltage to some of the semiconductor device components. Various types of circuits exist that are capable of generating and providing a reference voltage for a wide variety of applications. One of the most popular types is the band-gap reference (BGR) circuit.

Prior art reference voltage circuits are always powered up so that they can provide a reference voltage at any time. If a reference voltage circuit were powered down in order to minimize power consumption, it would be necessary to power up the reference voltage circuit whenever the reference voltage circuit was accessed to provide a reference voltage. Keeping a reference voltage circuit fully powered at all times continually consumes power.

Therefore, there is a need in the art for a system and method for minimizing power consumption in a reference voltage circuit. There is a need in the art for a system and method that can provide a reference voltage circuit that is capable of continually providing a reference voltage at all times without continually consuming power at all times.

SUMMARY OF THE INVENTION

To address the above-discussed deficiencies of the prior art, it is a primary object of the present invention to provide a system and method for minimizing power consumption in a reference voltage circuit.

In one advantageous embodiment of the present invention a capacitor is coupled to an output of a reference voltage circuit. The reference voltage circuit charges the capacitor to value of voltage that equals the reference voltage of the reference voltage circuit. The capacitor is then decoupled from the reference voltage circuit and power to the reference voltage circuit is turned off. The capacitor then provides the capacitor voltage to other circuits as a reference voltage.

Leakage current in the capacitor ultimately causes the capacitor voltage to decrease. After a timer determines that a selected period of time has elapsed since the capacitor was last charged up to the reference voltage, the timer turns on a power supply to power up the reference voltage circuit. The timer then causes the capacitor to be coupled to the reference voltage circuit. The reference voltage circuit then recharges the capacitor voltage back up to the reference voltage level. Then the capacitor is again decoupled from the reference voltage circuit and power to the reference voltage circuit is again turned off. The process of recharging the capacitor is periodically repeated to charge the capacitor to the reference voltage.

Power consumption by the reference voltage circuit is minimized by the present invention because the reference voltage circuit is powered down most of the time. The reference voltage circuit is only powered up to charge the capacitor.

It is an object of the present invention to provide a system and method for minimizing power consumption in a reference voltage circuit.

It is also an object of the present invention to provide a system and method for repeatedly charging a capacitor to a reference voltage.

It is yet another object of the present invention to provide a system and method for charging a capacitor to a reference voltage in which the capacitor is recharged after a selected period of time has elapsed since the capacitor was last charged to the reference voltage.

It is still another object of the present invention to provide a system and method for minimizing power consumption in a reference voltage circuit by powering up the reference voltage circuit only during times when the reference voltage circuit is needed to charge a capacitor to a reference voltage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or, remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged reference voltage generator circuit.

Figure 1:
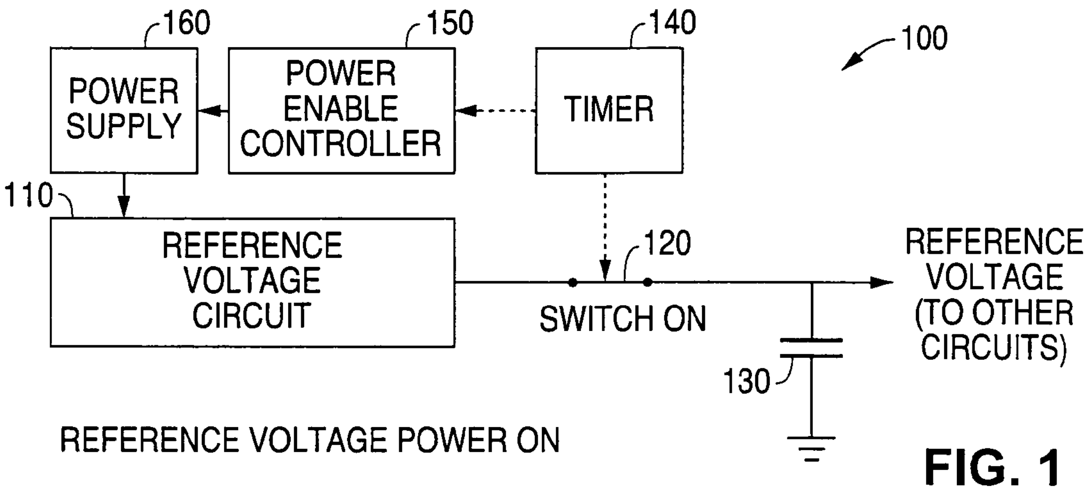
FIG. 1 illustrates a first advantageous embodiment of the present invention illustrating a start up/charging mode of operation.

FIG. 1 illustrates a first advantageous embodiment of the present invention 100 illustrating a start up/charging mode of operation. The first advantageous embodiment 100 of the present invention comprises reference voltage circuit 110, a switch 120, a capacitor 130, a timer 140, a power enable controller 150, and a power supply 160. Capacitor 130 is placed at the output of reference voltage circuit 110. Switch 120 is placed between the capacitor 130 and the reference voltage circuit 110. Switch 120 may comprise a transistor or any other similar type of electronic circuit that is capable of acting as a switch. In FIG. 1 switch 120 is in an "on" position (i.e., switch 120 is closed).

Timer 140 controls the operation of switch 120. Timer 140 also controls the operation of power enable controller 150. When timer 140 closes switch 120 then timer 140 also causes power enable controller 150 to enable power supply 160 to supply power to reference voltage circuit 110.

In the start up/charging mode of operation depicted in FIG. 1, reference voltage circuit 110 generates a reference voltage and capacitor 130 is charged up to a voltage that is equal to the reference voltage. After capacitor 130 has been charged up to the reference voltage the first advantageous embodiment of the invention 100 is ready to be placed into operation.

Figure 2:
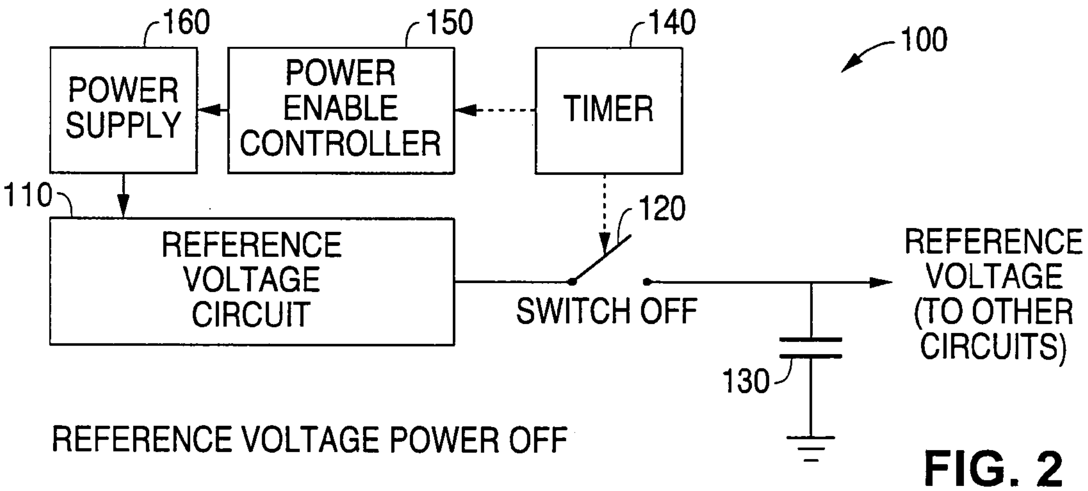
FIG. 2 illustrates the first advantageous embodiment of the present invention shown in FIG. 1 illustrating a low power consumption mode of operation.

FIG. 2 illustrates the operation of the first advantageous embodiment of the present invention 100 in a low power consumption mode of operation. In FIG. 2 switch 120 is in an "off" position (i.e., switch 120 is open). When timer 140 opens switch 120 then timer 140 also causes power enable controller 150 to disable power supply 160 and shut off power to reference voltage circuit 110.

Capacitor 130 now holds a voltage that is equal in value to the reference voltage. Other circuits (not shown in FIG. 1 or in FIG. 2) can use the voltage output of capacitor 130 as a reference voltage. In the low power consumption mode of operation the reference voltage circuit 110 is off and the capacitor 130 does not dissipate the direct current (DC) current. So the total current consumption is ideally zero.

In practice there is a certain amount of leakage current in capacitor 130 and the voltage of capacitor 130 gradually decreases over time. To maintain the desired value of voltage (i.e., the reference voltage) in capacitor 130 the reference voltage circuit 110 must be periodically powered up so that the reference voltage circuit 110 can recharge capacitor 130 back up to a voltage that equals the value of the reference voltage. In this manner any gradual decrease of voltage in capacitor 130 is corrected by the periodic recharging of capacitor 130.

This is accomplished by the operation of timer 140. Timer 140 determines how much time has elapsed since capacitor 130 was last charged up to the reference voltage. When timer 140 determines that an elapsed period of time has reached a value that equals a selected time period, then timer 140 closes switch 120 and causes power enable controller 150 to enable power supply 160 to power up reference voltage circuit 110. After reference voltage circuit 110 charges capacitor 130 back up to the reference voltage, then timer 140 opens switch 120, and causes power enable controller 150 to disable power supply 160 to power down reference voltage circuit 110, and resets timer 140. Timer 140 then continues to monitor the elapsed time until the next elapsed period of time reaches the value that equals the selected time period. In this manner timer 140 periodically repeats the process of recharging capacitor 130.

If there is no current consumption when the reference voltage circuit 110 is turned off, then the current consumption $I_{TOTAL\ LOSS}$ may be calculated from Equation (1) as follows:

$$I_{TOTAL\ LOSS} = \frac{T_{ON}}{T_{OFF} + T_{ON}} I_{LOSS} \tag{1}$$

The term $T_{ON}$ is the period of time during which the reference voltage circuit 110 is on (i.e., working). The term $T_{OFF}$ is the period of time during which the reference voltage circuit 110 is off (i.e., not working). The term $I_{LOSS}$ is the value of the current consumption during the time period $T_{ON}$. As long as the value of the period $T_{OFF}$ is much greater than the value of the period $T_{ON}$ (i.e., $T_{OFF} >> T_{ON}$), and the value of the current consumption $I_{LOSS}$ is very small, then the value of the total current consumption $I_{TOTAL\ LOSS}$ is very close to a zero value.

In practice, the use of a large capacitor for capacitor 130 is preferable because a large capacitor 130 means that longer periods of time $T_{OFF}$ may be obtained. The value of capacitor 130 should be at least one hundred picofarads (100 pF). The value of capacitor 130 should preferably be equal to several tens of nanofarads (nF). When capacitor 130 has such values of capacitance it takes a longer time to charge up capacitor 130 by an ordinary reference voltage circuit 110. This is because an ordinary reference voltage circuit 110 does not generate a large output current. Therefore, in a second advantageous embodiment of the principles of the present invention a buffer that can output a large current is used in place of switch 120. The second advantageous embodiment of the invention is illustrated in FIG. 3 and in FIG. 4.

Figure 3:
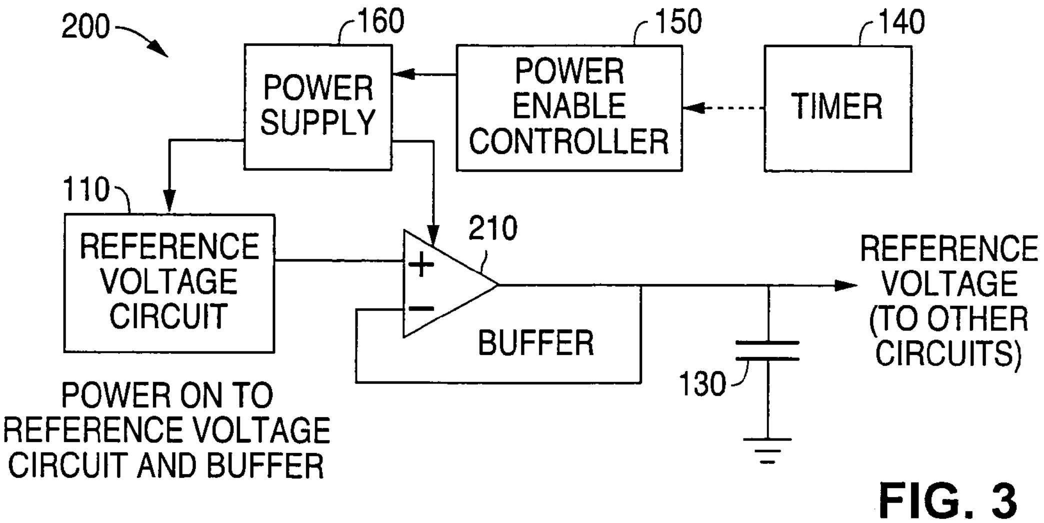
FIG. 3 illustrates a second advantageous embodiment of the present invention illustrating a start up/charging mode of operation.

FIG. 3 illustrates the second advantageous embodiment of the present invention 200 illustrating a start up/charging mode of operation. The second advantageous embodiment of the present invention 200 comprises reference voltage circuit 110, a buffer 210, a capacitor 130, a timer 140, a power enable controller 150 and a power supply 160. Capacitor 130 is placed at the output of reference voltage circuit 110. Buffer 210 is placed between the capacitor 130 and the reference voltage circuit 110. Buffer 210 may comprise an operational amplifier 210 or any other similar type of electronic circuit that is capable of acting as a buffer. In FIG. 3 buffer 210 is in an "on" condition.

Timer 140 controls the operation of power supply 160. When timer 140 causes power enable controller 150 to enable power supply 160 to supply power to reference voltage circuit 150 (and to buffer 210) then buffer 210 is in an "on" condition (i.e., working). When timer 140 causes power enable controller 150 to disable power supply 160 to shut down power to reference voltage circuit 110 (and to buffer 210) then buffer 210 is in an "off" condition (i.e., not working).

In the start up/charging mode of operation depicted in FIG. 3, reference voltage circuit 110 generates a reference voltage and capacitor 130 is charged up to a voltage that is equal to the reference voltage. After capacitor 130 has been charged up to the reference voltage the second advantageous embodiment of the invention 200 is ready to be placed into operation.

Figure 4:
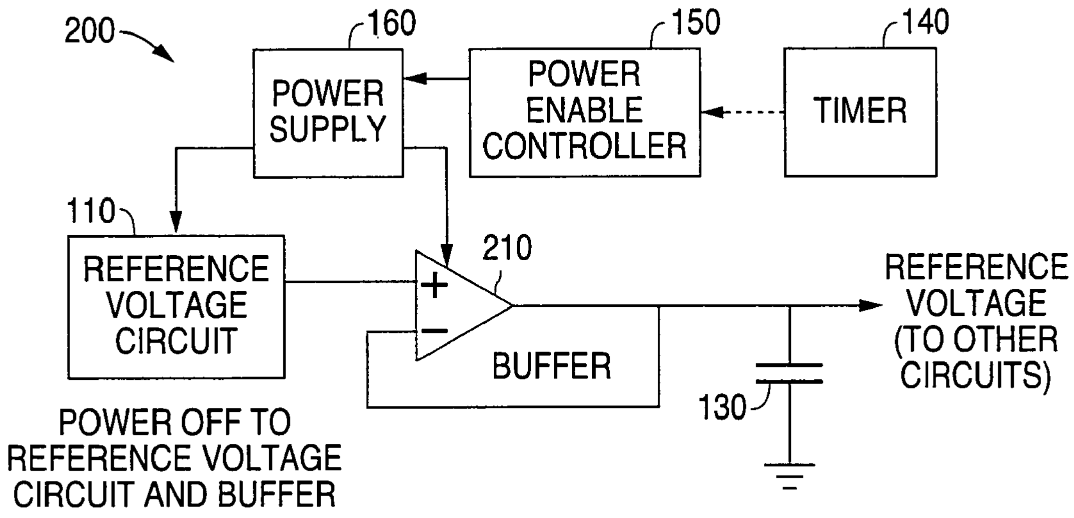
FIG. 4 illustrates the second advantageous embodiment of the present invention shown in FIG. 3 illustrating a low power consumption mode of operation.

FIG. 4 illustrates the operation of the second advantageous embodiment of the present invention 200 in a low power consumption mode of operation. In FIG. 4 buffer 210 is in an "off" condition. When buffer 210 is in an "off" condition (i.e., not working) the power to reference voltage circuit 110 (and buffer 210) is turned off. Buffer 210 has a very high impedance (open) when buffer 210 is in the "off" condition.

Equation (1) also applies to the second advantageous embodiment of the present invention 200 that comprises buffer 210 if the following changes are made to the definitions of the terms. The term $T_{ON}$ now refers to a period of time during which the reference voltage circuit 110 and the buffer 210 are on (i.e., working). The term $T_{OFF}$ now refers to a period of time during which the reference voltage circuit 110 and the buffer 210 are off (i.e., not working).

In practice there is a certain amount of leakage current in capacitor 130 and the voltage of capacitor 130 gradually decreases over time. To maintain the desired value of voltage (i.e., the reference voltage) in capacitor 130 the reference voltage circuit 110 must be periodically powered up so that the reference voltage circuit 110 can recharge capacitor 130 back up to a voltage that equals the value of the reference voltage. In this manner any gradual decrease of voltage in capacitor 130 is corrected by the periodic recharging of capacitor 130.

This is accomplished by the operation of timer 140. Timer 140 determines how much time has elapsed since capacitor 130 was last charged up to the reference voltage. When timer 140 determines that an elapsed period of time has reached a value that equals a selected time period, then timer 140 causes power enable controller 150 to enable power supply 160 to power up reference voltage circuit 110 and buffer 210. After reference voltage circuit 110 charges capacitor 130 back up to the reference voltage, then timer 140 causes power enable controller 150 to disable power supply 160 to power down reference voltage circuit 110 and buffer 210, and resets timer 140. Timer 140 then continues to monitor the elapsed time until the next elapsed period of time reaches the value that equals the selected time period. In this manner timer 140 periodically repeats the process of recharging capacitor 130.

Figure 5:
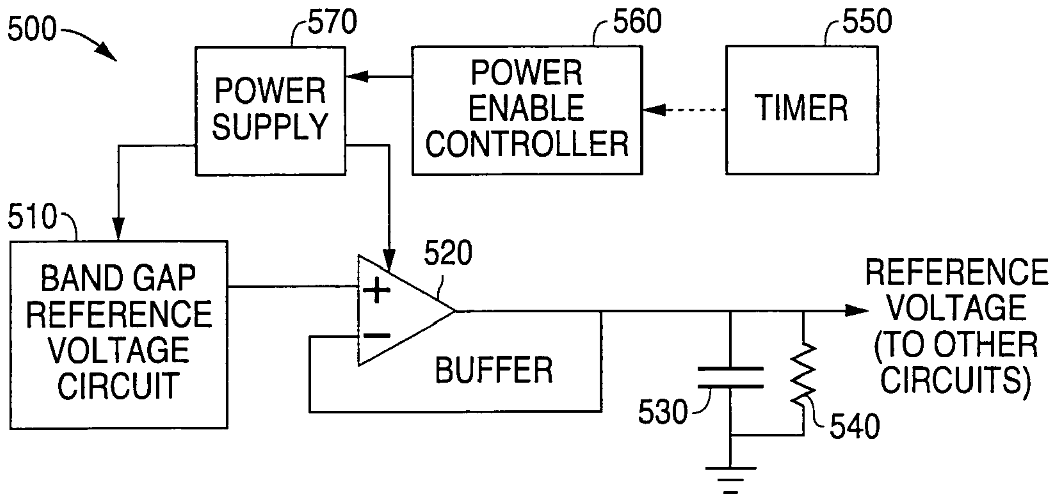
FIG. 5 illustrates a diagram of a circuit for simulating an operation of the second advantageous embodiment of the present invention.

FIG. 5 illustrates a diagram of a circuit 500 for simulating an operation of the second advantageous embodiment of the present invention 200. The circuit 500 comprises band gap reference voltage circuit 510, buffer 520, voltage reference capacitor 530, resistance 540, timer 550, power enable controller 560 and power supply 570. The band gap reference voltage circuit 510 was prepared with curvature correction. The buffer 520 is a unity gain buffer. The band gap voltage reference circuit 510 is very accurate but it consumes more than ten microamperes (10 μA) of current. The unity gain buffer 520 is also very accurate but it consumes twenty five microamperes (25 μA) to achieve accuracy and fast charging. The voltage reference capacitor 530 has a capacitance value of fifty nanofarads (50 nF). A ten million ohm ($10^7\Omega$) resistance 540 is coupled in parallel with the voltage reference capacitor 530 to model the leakage current of the voltage reference capacitor 530.

Figure 6:
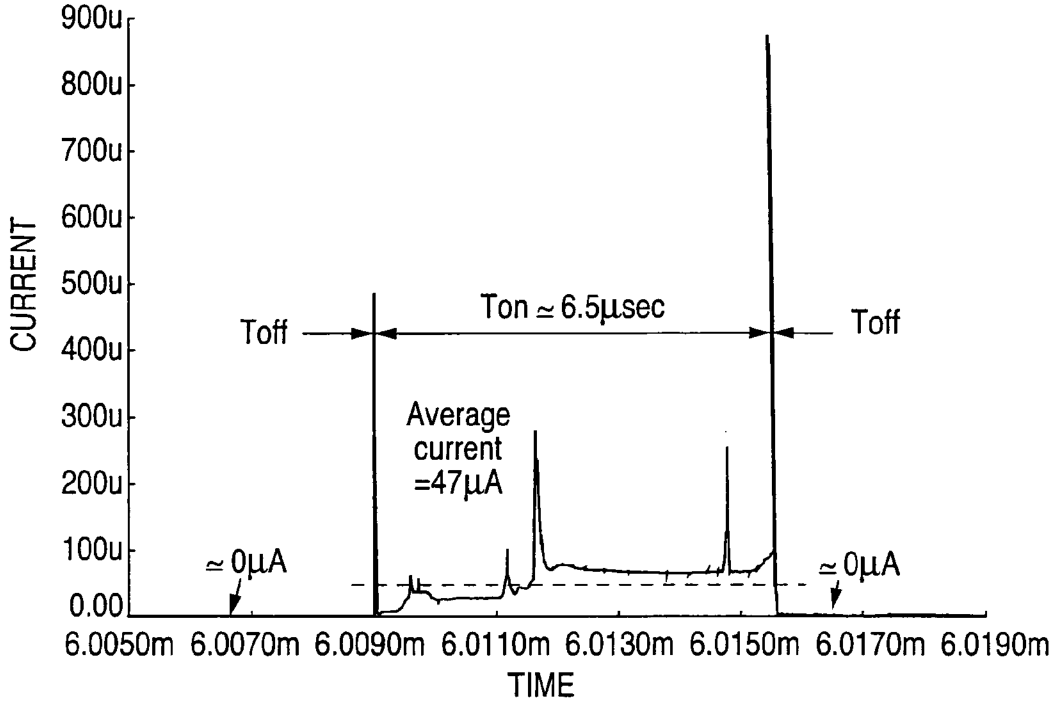
FIG. 6 illustrates a graph showing current consumption versus time in accordance with the principles of the present invention.
Figure 7:
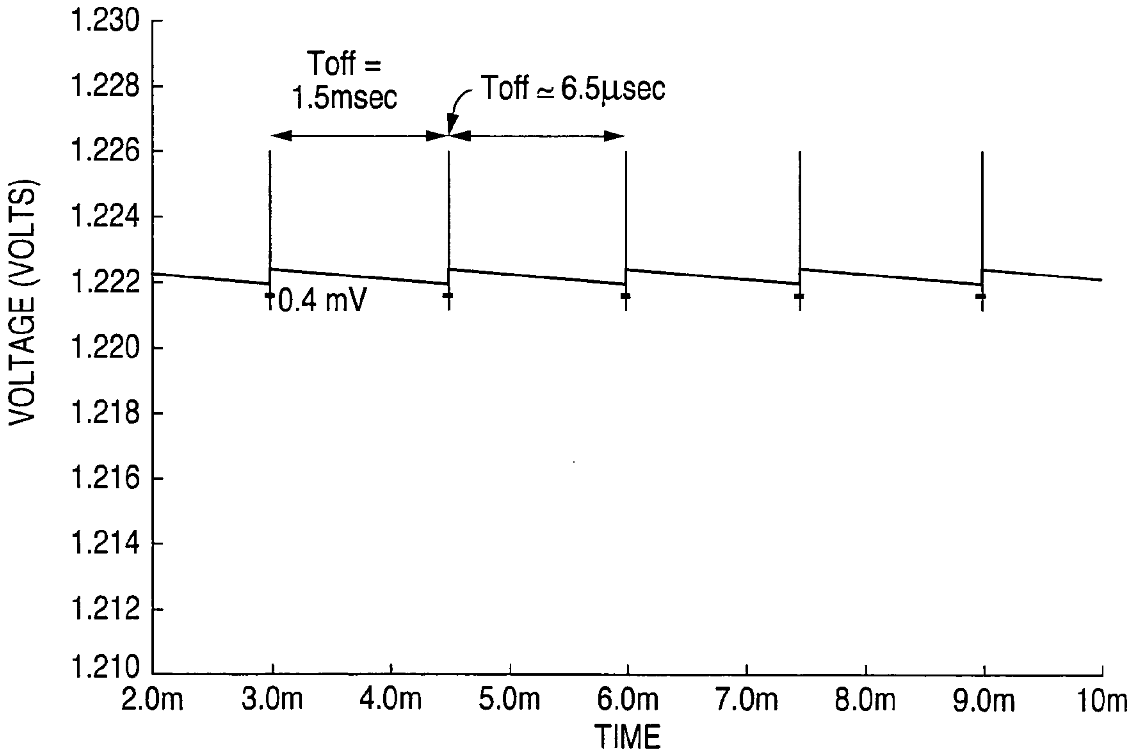
FIG. 7 illustrates a graph showing capacitor voltage versus time in accordance with the principles of the present invention.

The simulation results are shown in FIG. 6 and in FIG. 7. FIG. 6 illustrates a graph showing current consumption versus time during an exemplary time period $T_{ON}$. The time period $T_{ON}$ in the simulation has a value of six and one half microseconds (6.5 μsec). The vertical axis of the graph represents the current in units of microamperes (μA). As shown in the graph the microampere unit may also be represented by the letter "u". The values on the vertical axis run from zero microamperes (0.00 u) to nine hundred microamperes (900 u).

The horizontal axis of the graph represents time in units of milliseconds (msec). As shown in the graph the millisecond unit may also be represented by the letter "m". The time values on the horizontal axis run from six and five thousandths of a millisecond (6.005 m) to six and nineteen thousandths of a millisecond (6.019 m). The current consumption is very close to zero until the time reaches a time value of six and nine thousandths of a millisecond (6.009 m). At that point in time the current consumption increases and varies in value until the time reaches a time value of approximately six and one hundred fifty six ten thousandths of a millisecond (6.0156 m). The time period $T_{ON}$ during which the band gap reference voltage circuit 510 and the buffer 520 are active is approximately six and one half microseconds (6.5 μsec). In the simulation the average value of the current consumption $I_{LOSS}$ during the period $T_{ON}$ is approximately forty seven microamperes (47.0 μA or 47.0 u). After the period $T_{ON}$ has ended, the value of the current consumption once again becomes very close to zero.

FIG. 7 illustrates a graph showing capacitor voltage versus time. The vertical axis of the graph represents the reference capacitor voltage in units of volts (V). As shown in the graph the values on the vertical axis run from one and twenty one hundredths of a volt (1.210 V) to one and twenty three hundredths of a volt (1.230 V).

The horizontal axis of the graph represents time in units of milliseconds (msec). As shown in the graph the millisecond unit may also be represented by the letter "m". The time values on the horizontal axis run from two milliseconds (2.0 m) up to ten milliseconds (10.0 m).

In the simulation the reference voltage is one and two thousand two hundred twenty three ten thousandths volt (1.2223 V). The value of the "wake up" interval $T_{OFF}$ (i.e., the interval during which the band gap reference voltage circuit 510 and the buffer 520 are not active) is one and one half milliseconds (1.50 msec). In the simulation it takes approximately six and one half microseconds (6.5 μsec) for the band gap reference voltage circuit 510 and the buffer 520 to become activated and charge the reference voltage capacitor 530 up to the value of the reference voltage (i.e., 1.2223 volt).

As previously mentioned, the average value of the current consumption $I_{LOSS}$ during the period $T_{ON}$ is approximately forty seven microamperes (47.0 μA). The value of current consumption $I_{LOSS}$ includes the current in the band gap reference voltage circuit 510 and the buffer 520 and the capacitor charge current. The overall current consumption $I_{TOTAL\ LOSS}$ may be calculated from Equation (1) as follows:

$$I_{TOTAL\ LOSS} = \frac{6.5\ \mu\text{sec}}{1.5\ \text{msec} + 6.5\ \mu\text{sec}} 47.0\ \mu\text{A} \tag{2}$$

$$I_{TOTAL\ LOSS} \cong \frac{6.5\ \mu\text{sec}}{1.5\ \text{msec}} 47.0\ \mu\text{A} \tag{3}$$

$$I_{TOTAL\ LOSS} \approx 0.203\ \mu\text{A} \tag{4}$$

The overall current consumption is approximately two tenths of a microampere (0.2 μA). This result compares very favorably with the value of overall current consumption of ten microamperes (10.0 μA) that is obtained when only the band gap reference voltage circuit 510 is used. The overall current consumption is improved by a factor of fifty (50).

Because there is leakage current in the reference voltage capacitor 530 the output voltage of capacitor 530 is not perfectly constant. This is clearly shown in FIG. 7 where the output voltage of capacitor 530 steadily declines throughout each $T_{OFF}$ period. But during each $T_{ON}$ period (approximately 6.5 μsec) the value of the voltage of the capacitor 530 is recharged to the reference voltage (1.2223 V). Because the peak-to-peak fluctuation is only approximately four tenths of a millivolt (0.4 mV) (which represents a three hundredths percent (0.03%) fluctuation) the value of the output voltage of capacitor 530 is accurate enough for most applications.

Figure 8:
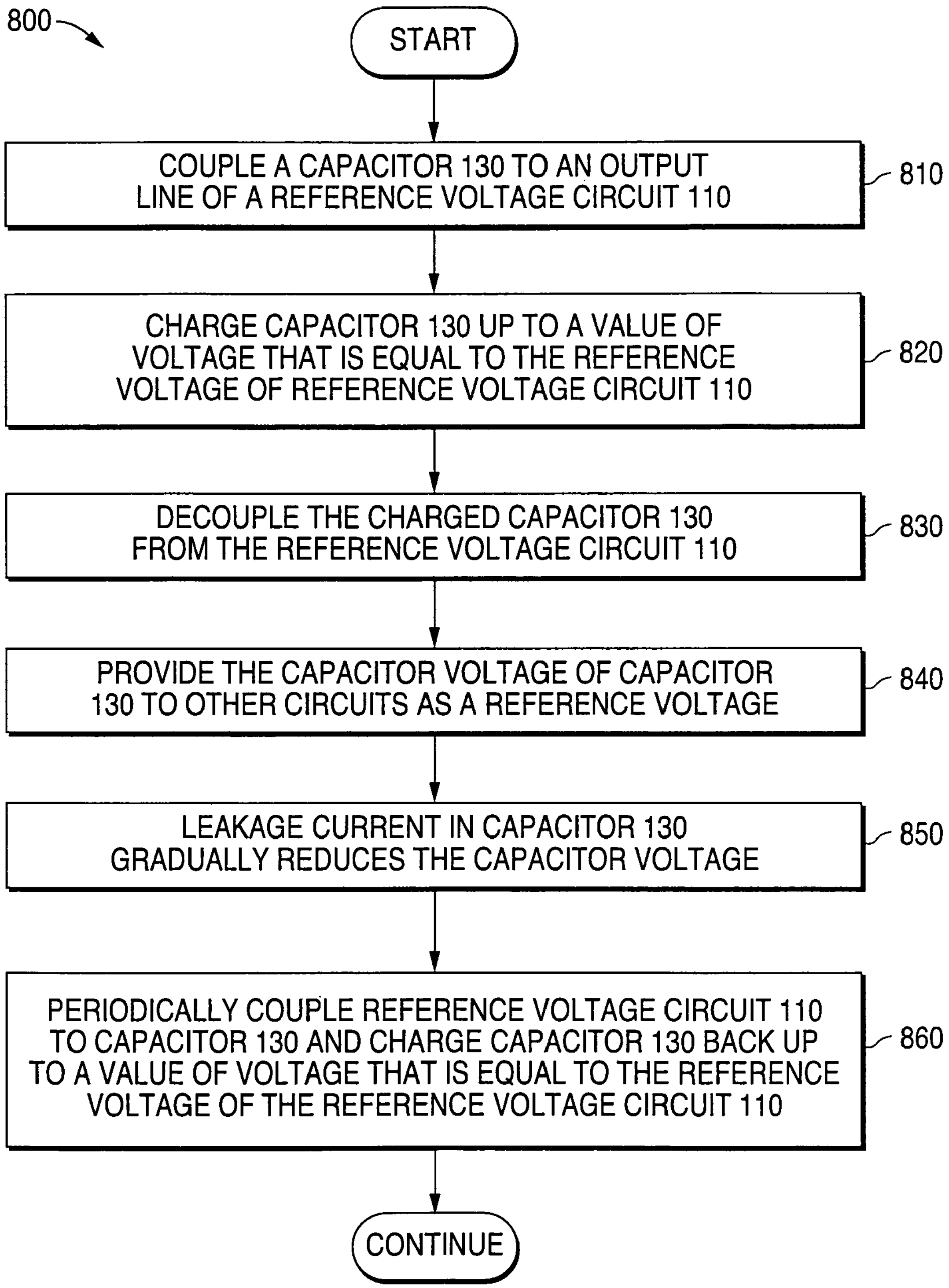
FIG. 8 illustrates a flow chart showing the steps of a first advantageous embodiment of the method of the present invention.

FIG. 8 illustrates a flow chart 800 showing the steps of a first advantageous embodiment of the method of the present invention. The method of the present invention begins by coupling a capacitor 130 to an output line of a reference voltage circuit 110 (step 810). Then the capacitor 130 is charged up to a value of voltage that is equal to the reference voltage of reference voltage circuit 110 (step 820). The capacitor 130 is then decoupled from the reference voltage circuit 110 (step 830).

The capacitor voltage of capacitor 130 is then provided to other circuits as a reference voltage (step 840). Leakage current in capacitor 130 gradually reduces the capacitor voltage (step 850). The reference voltage circuit 110 is periodically coupled to the capacitor 130 and charges capacitor 130 back up to a value of voltage that is equal to the reference voltage of the reference voltage circuit 110 (step 860).

Figure 9:
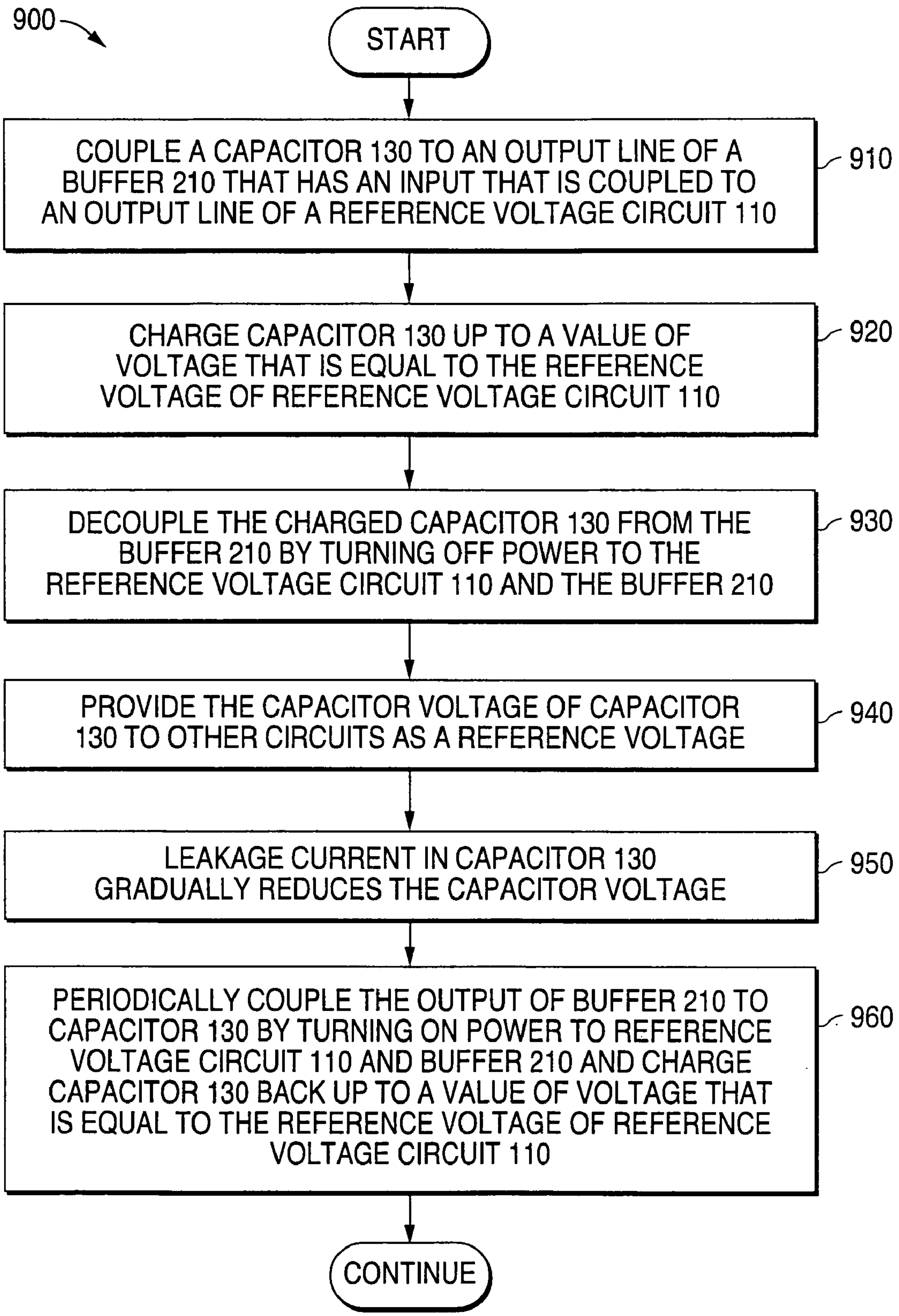
FIG. 9 illustrates a flow chart showing the steps of a second advantageous embodiment of the method of the present invention

FIG. 9 illustrates a flow chart 800 showing the steps of a second advantageous embodiment of the method of the present invention. The method of the present invention begins by coupling a capacitor 130 to an output line of a buffer 210 that has an input that is coupled to an output line of a reference voltage circuit 110 (step 910). Then the capacitor 130 is charged up to a value of voltage that is equal to the reference voltage of reference voltage circuit 110 (step 920). The capacitor 130 is then decoupled from the buffer 210 by turning off power to the reference voltage circuit 110 and the buffer 210 (step 930).

The capacitor voltage of capacitor 130 is then provided to other circuits as a reference voltage (step 940). Leakage current in capacitor 130 gradually reduces the capacitor voltage (step 950). The output of buffer 210 is periodically coupled to the capacitor 130 by turning on power to the reference voltage circuit 110 and the buffer 210. The output of buffer 210 charges capacitor 130 back up to a value of voltage that is equal to the reference voltage of the reference voltage circuit 110 (step 960).

The apparatus and method of the present invention may be employed in voltage regulator circuits (e.g., a direct current (DC) to direct current (DC) converter). In such applications the apparatus and method of the present invention may be used (1) as a soft start control capacitor, and (2) as a holding reference voltage capacitor.

A soft start procedure avoids a rush current by gradually increasing the output voltage (1) at start-up, and (2) at a change of output voltage. A soft start procedure may be easily implemented by gradually increasing the reference voltage. In the present invention a current control function in buffer 210 may be used to gradually increase the reference voltage.

For example, if the maximum output current of buffer 210 is limited at start-up, the capacitor output voltage of capacitor 130 is gradually charged up. The gradual increase in the reference voltage that is provided by capacitor 130 provides the gradual increase in output voltage for the soft start procedure. The rate of increase of the reference voltage is determined by the maximum output current of buffer 210 and the value of capacitance of capacitor 130. Because the value of capacitance of capacitor 130 is not so important for a holding reference voltage, the value of capacitance of capacitor 130 may be optimized for an appropriate rate of increase of the reference voltage for the soft start procedure.

The placement of capacitor 310 at the output of a voltage regulator circuit also makes the reference voltage node more noise tolerant and stable.

The apparatus and method of the present invention is very suitable for use in a switching converter circuit that has a "stand by" mode (a low quiescent current mode). This is because a reference voltage circuit has a substantial portion of the total current consumption in a "stand by" mode.

Although the present invention has been described with an exemplary embodiment, various changes and modifications may be suggested to one skilled in the art. It is intended that the present invention encompass such changes and modifications as fall within the scope of the appended claims.

What is claimed is:

1. A method for minimizing power consumption in a reference voltage circuit, said method comprising the steps of:

coupling a capacitor to an output line of a buffer that has an input that is coupled to an output line of said reference voltage circuit;

charging said capacitor to a voltage that at least approximately equals a reference voltage of said reference voltage circuit;

decoupling said capacitor from said reference voltage circuit;

turning off power to said reference voltage circuit and to said buffer; and providing capacitor voltage of said capacitor to at least one other circuit as a reference voltage.

2. The method as set forth in claim 1 further comprising the steps of:

periodically coupling said reference voltage circuit to said capacitor;

turning on power to said reference voltage circuit and to said buffer when said capacitor is coupled to said reference voltage circuit; and charging said capacitor when said reference voltage circuit is coupled to said capacitor.

3. The method as set forth in claim 2 wherein said step of periodically coupling said reference voltage circuit to said capacitor further comprises the step of:

performing said step of periodically coupling said reference voltage circuit to said capacitor after a selected period of time has elapsed since said capacitor was last charged.

4. The method as set forth in claim 1 wherein said step of charging said capacitor to said voltage that at least approximately equals said reference voltage of said reference voltage circuit comprises the step of:

charging said capacitor to said voltage through said buffer.

5. The method as set forth in claim 2 wherein said capacitor is one of: a soft start control capacitor and a holding reference voltage capacitor.

6. An apparatus for minimizing power consumption in a reference voltage circuit, said apparatus comprising:

a capacitor coupled to an output of said reference voltage circuit; and a buffer coupled between said capacitor and said reference voltage circuit, wherein said buffer couples said capacitor to said reference voltage circuit after a selected period of time has elapsed since said capacitor was last charged to a voltage that at least approximately equals a reference voltage of said reference voltage circuit.

7. The apparatus as set forth in claim 6 wherein power to said reference voltage circuit is turned off when said reference voltage circuit is not coupled to said capacitor.

8. The apparatus as set forth in claim 6 wherein said buffer comprises an operational amplifier.

9. The apparatus as set forth in claim 6 wherein said capacitor comprises one of: a soft start control capacitor and a holding reference voltage capacitor.

10. The apparatus as set forth in claim 6, wherein said capacitor is periodically monitored to verify that it charges to said voltage that is at least approximately equal to said reference voltage.

11. A circuit comprising:

a capacitor coupled to an output line of a buffer that has an input, wherein said input is coupled to an output line of said circuit;

wherein, after said capacitor is charged to a voltage that at least approximately equals a reference voltage of said circuit, said capacitor is decoupled from said circuit; and wherein said capacitor is coupled to at least one other circuit and provides said voltage to said at least one other circuit.

12. The circuit of claim 11, wherein said buffer is decoupled from said circuit in order to decouple said capacitor from said circuit.

13. The circuit of claim 11, wherein said buffer is coupled to said circuit for a predetermined time period.

14. The circuit as set forth in claim 11 wherein said buffer couples said capacitor to said circuit after a selected period of time has elapsed since said capacitor was last charged.

15. The circuit as set forth in claim 11 wherein power to said circuit is turned off when said circuit is not coupled to said capacitor.

16. The circuit as set forth in claim 11, wherein said buffer comprises an operational amplifier.

17. The circuit as set forth in claim 11, wherein said capacitor comprises one of: a soft start control capacitor and a holding reference voltage capacitor.

18. The circuit as set forth in claim 16, wherein said capacitor comprises a soft start control capacitor.

19. The circuit as set forth in claim 16, wherein said capacitor comprises a holding reference voltage capacitor.

20. The circuit as set forth in claim 11, wherein said capacitor is periodically monitored to verify that it charges to said voltage that is at least approximately equal to said reference voltage.

* * * * *